(12) United States Patent
Morydz

(10) Patent No.: US 11,403,594 B2
(45) Date of Patent: Aug. 2, 2022

(54) SYSTEM AND METHOD FOR MANAGING PROJECT AND BUSINESS RECORDS

(71) Applicant: Nooreq Inc., Villa Park, IL (US)

(72) Inventor: Andrzej Morydz, Villa Park, IL (US)

(73) Assignee: Nooreq Inc., Villa Park, IL (US)

( * ) Notice: Subject to any disclaimer, the term of this patent is extended or adjusted under 35 U.S.C. 154(b) by 0 days.

(21) Appl. No.: 16/247,558

(22) Filed: Jan. 14, 2019

(65) Prior Publication Data

US 2019/0220822 A1 Jul. 18, 2019

Related U.S. Application Data

(60) Provisional application No. 62/616,926, filed on Jan. 12, 2018.

(51) Int. Cl.
| | | |
|---|---|---|
| *G06Q 10/10* | (2012.01) | |
| *H04L 51/046* | (2022.01) | |
| *H04L 51/08* | (2022.01) | |
| *H04L 67/1097* | (2022.01) | |
| *G06Q 10/06* | (2012.01) | |
| *H04L 51/58* | (2022.01) | |

(52) U.S. Cl.
CPC ......... *G06Q 10/103* (2013.01); *G06Q 10/107* (2013.01); *H04L 51/046* (2013.01); *H04L 51/08* (2013.01); *H04L 67/1097* (2013.01)

(58) Field of Classification Search
CPC .... G06Q 10/103; G06Q 10/107; H04L 51/08; H04L 51/046; H04L 67/1097; H04L 51/38

See application file for complete search history.

(56) References Cited

U.S. PATENT DOCUMENTS

| | | | |
|---|---|---|---|
| 2006/0089130 A1* | 4/2006 | Yamamura | H04L 51/24 455/412.2 |
| 2006/0155811 A1* | 7/2006 | Goh | G06Q 10/107 709/206 |

(Continued)

OTHER PUBLICATIONS

Title: How to Share Photos and Videos From an iOS Device Author: Hannah Williams Year: Jan. 5, 2018. pp 1-2, 8-9, 11-12, 14 URL: https://computers.tutsplus.com/tutorials/how-to-share-photos-and-videos-from-an-ios-device-cms-29870 (Year: 2018).*

(Continued)

*Primary Examiner* — Ramy M Osman
*Assistant Examiner* — Kamal Hossain
(74) *Attorney, Agent, or Firm* — K&L Gates LLP

(57) ABSTRACT

A system for utilizing a remote server to transmit a message includes a user device including a controller, a memory coupled to the controller, and a database in communication with the remote server. The user device is in communication with the remote server. The controller is configured to generate a message based on data from the database, receive input from the user to send the message and a data file to a receiver, provide, through a user interface, a first option and a second option for sending the message and the data file to the receiver, and receive a selection from the user between the first option and the second option. If the user selects the first option, send the message and a data file using an email service provider. If the user selects the second option, send the message to the server through a network connection.

5 Claims, 11 Drawing Sheets

(56) References Cited

U.S. PATENT DOCUMENTS

| | | | |
|---|---|---|---|
| 2009/0216845 A1* | 8/2009 | Giszczak | H04L 51/14 709/206 |
| 2014/0013212 A1* | 1/2014 | Von Haden | G06F 40/186 715/243 |
| 2015/0134751 A1* | 5/2015 | Meyers, Jr. | H04L 51/08 709/206 |
| 2016/0285795 A1* | 9/2016 | Beausoleil | G06F 16/9574 |
| 2017/0214642 A1* | 7/2017 | Tichauer | H04L 51/22 |

OTHER PUBLICATIONS

International Search Report and Written Opinion of the International Searching Authority prepared by the USPTO in connection with PCT/US2019/13555, dated Apr. 22, 2019; Entire Document (9 pages).

* cited by examiner

SYSTEM AND METHOD FOR MANAGING PROJECT AND BUSINESS RECORDS

CROSS-REFERENCE TO RELATED APPLICATIONS

This application claims the benefit of priority to U.S. Provisional Application No. 62/616,926 filed on Jan. 12, 2018, the disclosure of which is incorporated by reference herein.

BACKGROUND OF THE INVENTION

The present subject matter relates generally to a system and method for storing, organizing, generating, and sharing freelance project and business records. More specifically, the present invention relates to a system for uploading information such as dates, notes, pay-schedules, professional certifications, statuses, and past project descriptions, compiling this information for the purpose of generating reports and other business records, and sending these same reports to a receiver using a server system accessible to the sender off- or online, thus allowing the sender to maintain and share up-to-date business records and correspondence even in locations with poor network connectivity.

Freelancing often allows individuals with specialized certifications to capitalize on their unique skills. Niche professionals, such as saturation divers who work on underwater heavy construction, take on a high volume of projects through freelancing because they are not tied to a single client or geographic region. But this high volume and variety of projects can lead to inconvenience, inefficiency, and, ultimately, missed opportunities for freelancers given the inherent difficulty in centralizing, streamlining, and communicating project data, especially while in remote locations.

For many freelancers, being able to maintain and share up-to-date and uniform business records and other essential business communications regardless of their location and schedule is crucial to their business. This is especially true for such freelancers as saturation divers, who often must manage various aspects of their business from remote locations with little connectivity to internet infrastructure.

Up-to-date project and records management and sharing secures and enhances a freelancer's business, opening up a sea of possible opportunities. But working in a remote location could leave a freelancer stranded in that sea without a means to communicate with existing collaborators or clients. This has practical consequences for the freelancer since progress on concurrent projects could stall and opportunities with other clients could be missed without timely and up-to-date communication. Additionally, freelancers could become inundated with a backlog of project notes and information without a means to readily upload and manage them in a central business database.

Freelancers also must compile and format all of their business data themselves. This task is cumbersome when a freelancer is dealing with a high volume of projects. Invoices, resume updates, and certification requirements risk being lost under the demands of the freelancer's project workload.

Missed invoices, certification renewals, or even an old resume could mean a loss of time, business, or revenue for a freelancer. But this can be a common result for freelancers with demanding schedules, especially if they are inexperienced or unfamiliar with standard business practices and records.

Accordingly, there is a need for a system and method for uploading freelancer project data to a central database and compiling it into uniform business records and documentation capable of being managed and shared with collaborators and clients even in remote locations with poor connectivity.

BRIEF SUMMARY OF INVENTION

To meet the needs described above and others, the present disclosure provides a system and method for uploading freelancer project and business data to a centralized database, compiling it into uniform business records and documentation, and managing and sharing the same, even while the user/sender is in locations with poor connectivity.

By allowing freelancers to send this and other information by pinging dedicated servers with a message that is up to 40 MBs in size, the system and method allows users to send larger files and data even while in locations with poor connectivity.

Furthermore, by providing templates that automatically populate and format user-entered project and business data into sharable records and documentation, the system and method allows freelancers to conveniently maintain and share up-to-date records with collaborators and clients alike.

The system includes a controller that facilitates communications between a plurality of users. The controller is in communication with a dedicated server for storage of user data. Specifically, user-entered project/business data is transmitted to the server, which can be accessed, compiled, edited, and, ultimately, shared through a software application. Users access the system through a plurality of user devices, such as computers, laptops, mobile phones, or tablets.

To initiate the system, a user opens the software application. In the "calendar" mode, the user may view project timelines, alerts, and notes in the context of a given month or year. The user may then choose to either view already entered data or add a project, note, alert, or other detail. A user may also choose to generate such business records as resumes, invoices, or client lists in addition to uploading or managing the same. In some embodiments, the system may operate through a mobile phone application incorporating elements of location-based search applications. In other embodiments, the system may function through the use of a website or software application, whereby the user uploads information to the system so that it may be compiled, managed, and shared through the system.

These options present the user with data fields in which they can enter the relevant information. When the user enters the data, they may have the option to generate a business record that is already templated in the software. Once the user decides to generate this record, they may choose to further edit its contents or formatting. The system may provide multiple methods for compiling, formatting, and generating these records.

If the user wishes to share uploaded information or an uploaded or generated record, they may choose to "share" it with an individual through the app. To share, a user may select data or a document within the app, select "share", and then specify which email address they would like to send their selection.

In some embodiments, the user has the option to send messages using available email providers or the server of the system. The system 100 provides the user with the option to send a message with an attachment using an available email provider such as Gmail®, Yahoo®, or Hotmail®, or to send the message with an attachment directly to the receiver through the server. In the latter option, a message is sent from the user's device to the server through a network connection such as a cellular service or Wi-Fi network, and the server transmits the message to the receiver. The size of the message that is transmitted through a limited connection may be between about 800 bytes to about 40 KB. Once the server receives this message, it automatically retrieves the attachment or data file from the user device and forwards it to the user's specified recipient. In an alternative embodiment, the system detects the available internet speed and then sends the message and attachment using an available email provider if the speed is above a specific threshold and sends the message and attachment using the server as described above if the speed is below the threshold.

The user may have a variety of options regarding the data they may be able to capture and compile through the system. This may consist of not only text data, but also photographs and audio-visual recordings.

Users may search for professional services, such as training companies that may issue certifications needed in a freelancer's field. The user may use their location to find these services. This search function may also incorporate user contributions in the form of ratings. Additionally, this search function may also incorporate specialty offers from businesses partnering with the system.

The file upload system may be integrated with other document creation, storage, and sharing platforms. For example, some systems enable users to create, store, manage, and share more general documents such as spread sheets or presentations. The system described herein may be integrated with these platforms, allowing users to import these documents.

The system may also have features that allow partners to promote their services by targeted advertising to specific industries. For example, a training school for saturation divers may use the system to send offers to users who identify saturation diving as their industry. This feature may be integrated with user-generated alerts that indicate a certain training or certification will need to be obtained or renewed. If a user has set an alert that they will need to renew a certification, for example, the system may forward an offer to this user from a partner training school that offers a relevant certification program.

Although, by way of example, this specification is primarily directed towards freelance saturation divers, the system described herein may be applied to any industry where a freelancer needs to upload, store, and manage data in a centralized database and compile this data into sharable business records for convenient sharing.

An object of the invention is to provide freelancers with a centralized database for their business data.

Another object of the invention is to allow users the ability to conveniently access and manage their business records.

Another object of the invention is to allow users the ability to conveniently compile their business data into formatted records such as invoices and resumes.

Another object of the invention is to allow users the ability to conveniently keep their business records up to date.

Another object of the invention is to allow users the ability to conveniently communicate with collaborators and clients.

Another object of the invention is to allow freelancers a means of sending business records, data, and other correspondence to collaborators and clients in locations with poor connectivity.

An advantage of the invention is that it gives users the ability to upload, manage, compile, and share their business data and records from a single software application and database. This allows users to centralize their freelancing business, leading to more convenient and efficient operations.

Another advantage of the invention is that it shares records by forwarding them from dedicated servers rather than the user's own device. This may allow the user to send files even from locations with poor connectivity since the user's device only uses byte-size messages to direct a server to forward a larger file. Since these smaller messages can be sent even over poorly connected networks, whereas larger files cannot, a user of the system described herein may have greater flexibility in sending larger-sized business records from locations with minimal or poor connectivity.

A further advantage of the invention is that the use of the server within the system reduces the data roaming charges and other miscellaneous fees that may accrue when working in a remote location.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

The drawing figures depict one or more implementations in accord with the present concepts, by way of example only, not by way of limitations.

DETAILED DESCRIPTION OF THE INVENTION

Figure 1:
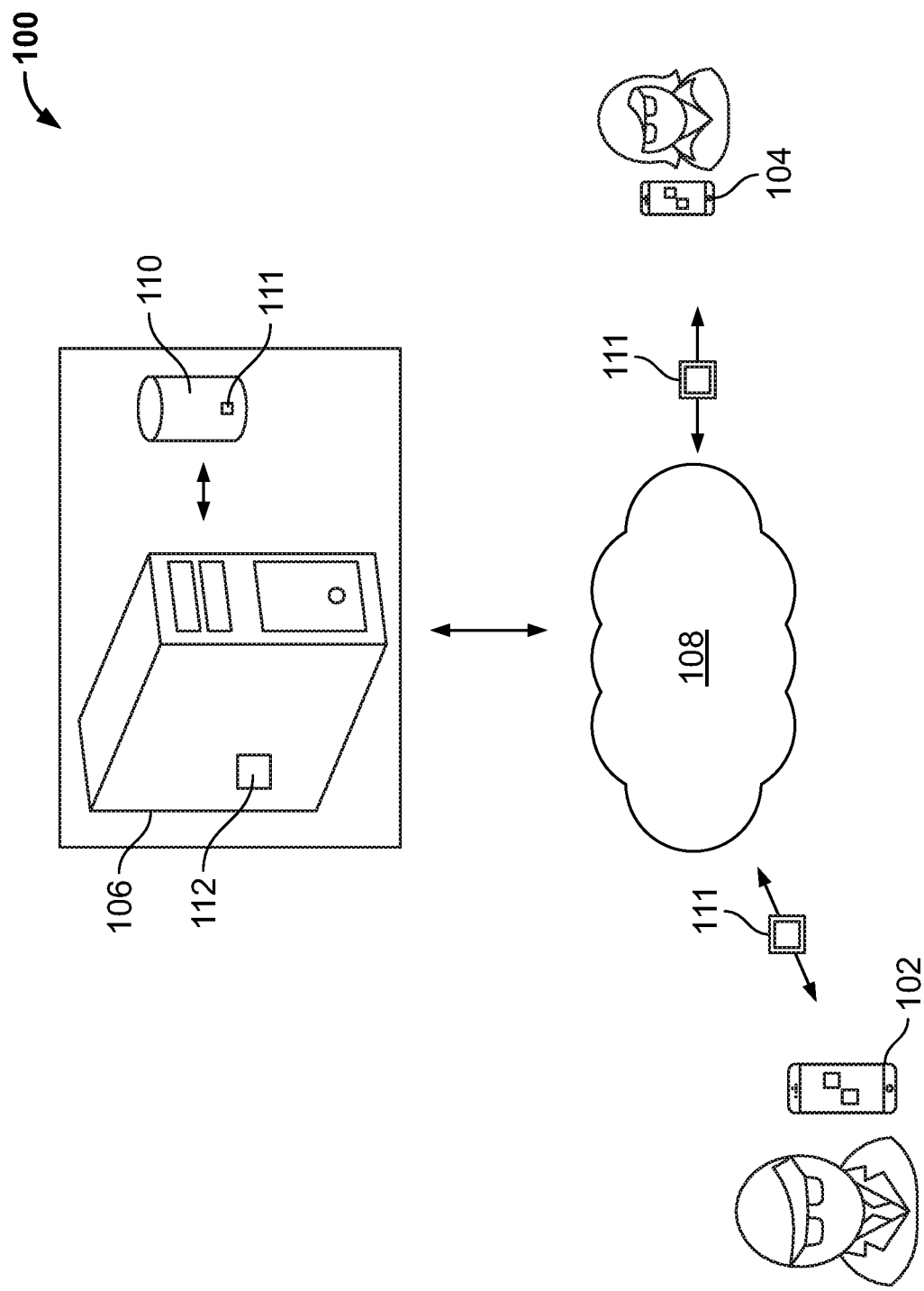
FIG. 1 is a diagram demonstrating the components of a system for managing project and business records of the present application.

FIG. 1 illustrates an example system for managing project and business records 100. The system 100 includes a sending user device 102 and a receiving user device 104 in communication with a server 106. Wired or wireless communication links over the internet or other cellular network 108 relay data 111 between the devices 102, 104 and the server 106. The server 106 hosts a program that may be accessed through the Internet or on a mobile application running on the devices 102, 104, although the receiving user device 104 does not need to use the app in order to receive communications. A database 110 used in connection with the server 106 stores data 111. The system 100 may be integrated with an advertising platform accessed through the Internet or cellular network 108 to allow users to access special offers 186 (see FIG. 11) related to data 111 stored on the system 100.

Figure 2:
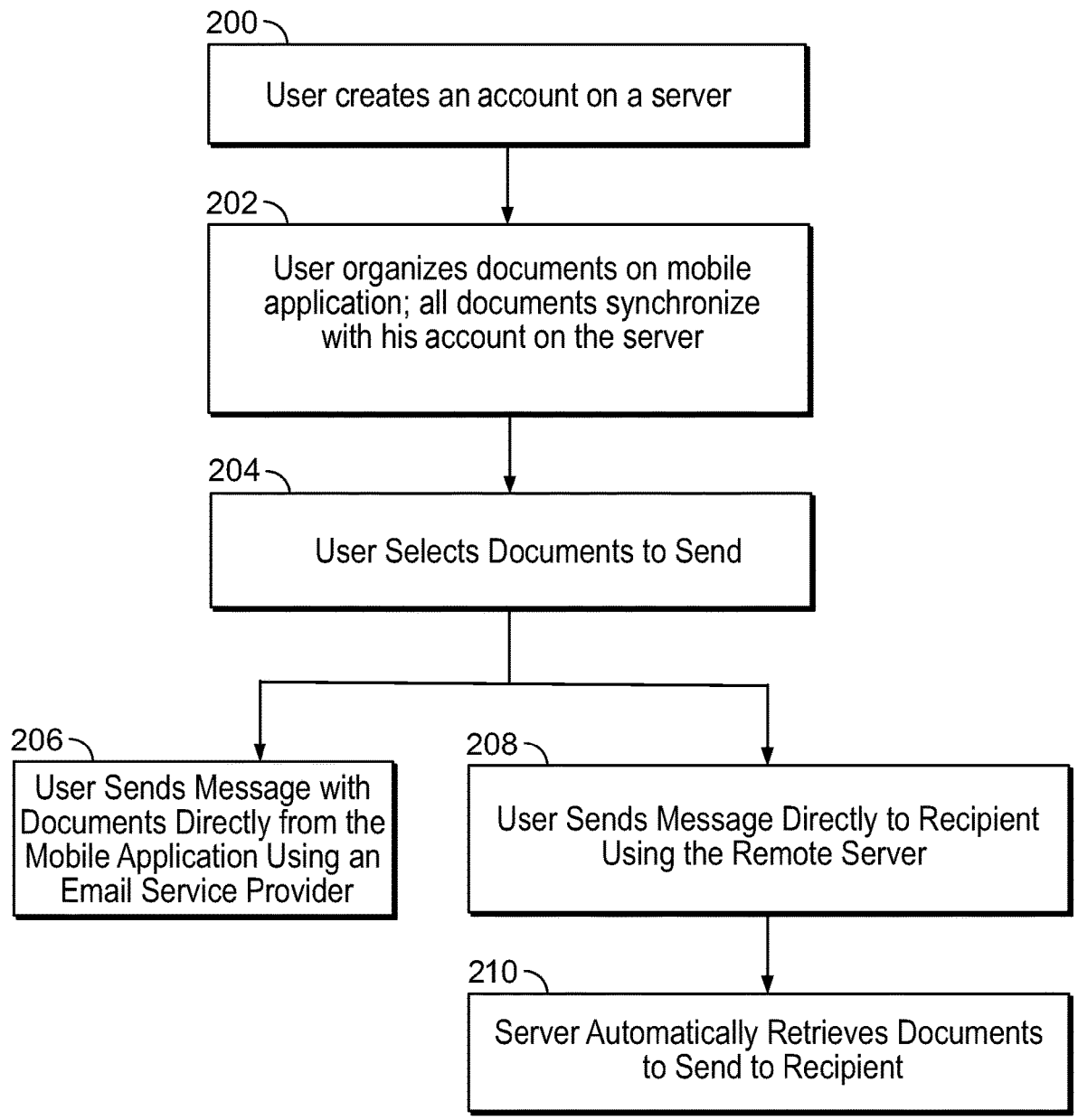
FIG. 2 is a flow-chart illustrating the steps to the method undertaken by the system of the present application.

The system 100 also includes a memory 112 coupled to the server 106, wherein the memory 112 is configured to store program instructions executable by the server 106. The server 106 is configured to perform the steps set forth in FIG. 2 and to provide the user interfaces of FIGS. 3-11.

Referring to FIGS. 1-11, the sending user using the device 102 to connect with the Internet or cellular network 108 may access the program hosted on the server 106. There, the sending user may enter or otherwise upload data 111 and opt to generate a note, alert, or other data entry. The sending user may choose to enter data 111 into fields generated within the program shown in the user interfaces of FIGS. 3-11. The sending user may then opt to compile this data into a specific business record, which the program may use to generate an example preview screen 1100 (see FIG. 10). The resulting data entry or record may be stored in the database 110 and/or transmitted through the Internet or cellular network 108 to a receiving user device 104 at the user's request (see FIG. 2). When the sending user requests that a particular data or document be sent to a recipient's device, the user device may generate and send a communication to the server using a message having a size of up to about 40 MB. This communication may direct the server 106 to forward specific data to the recipient through the user's account on the system 100. The resulting sending user communication may be transmitted via the Internet through traditional communication channels like e-mail or an application as shown in the user interface of FIG. 8.

The application hosted by the server may include a network which includes user profiles and enables user communication within the network.

Referring to FIGS. 3-10, a sending user may utilize the user interface of the program being hosted by the server and run on the sending user's device in order to initiate the system. The interface may include different categories that allow users to select particular data sets or business records.

Figure 3:
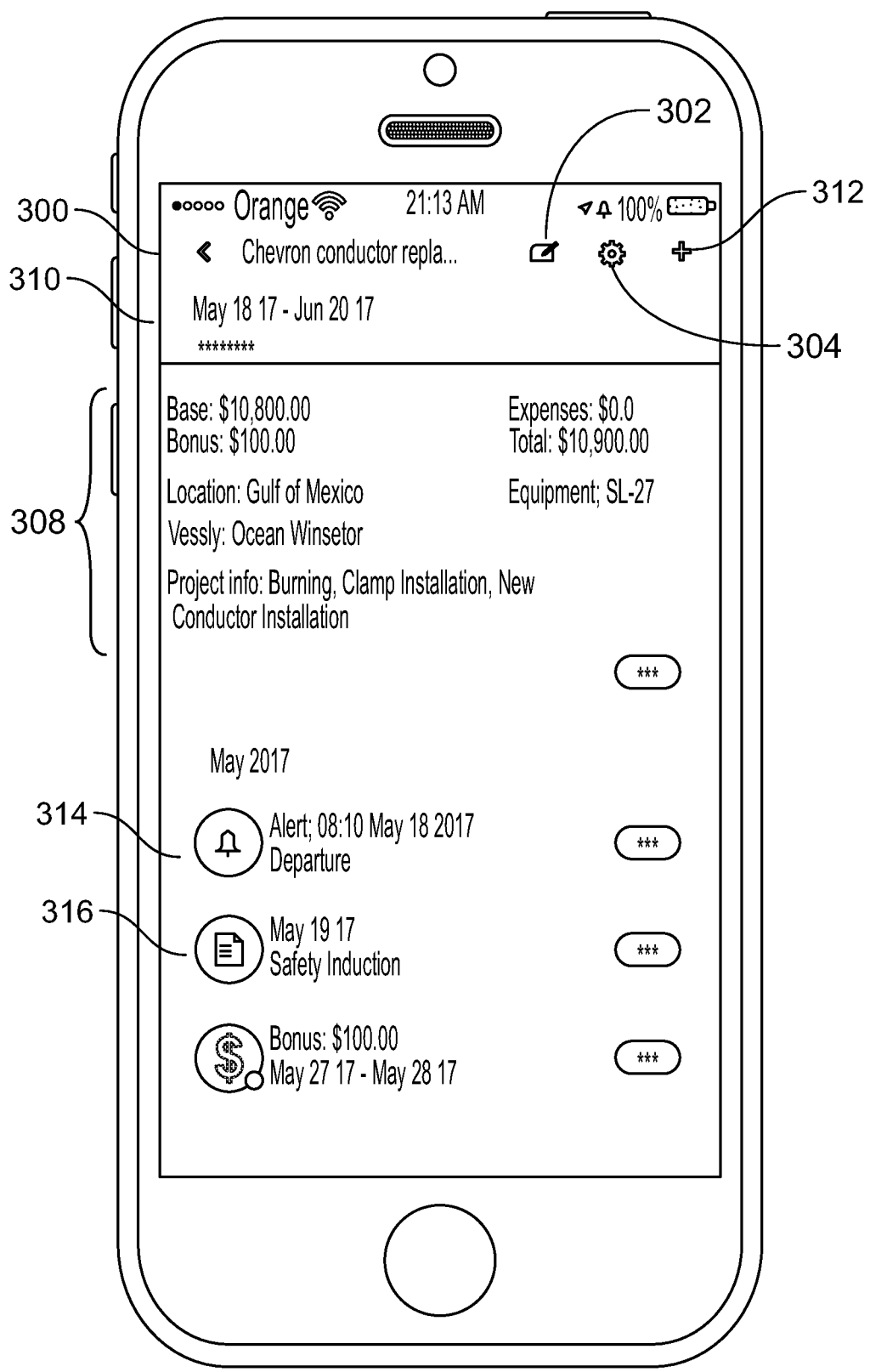
FIG. 3 is an example of a project view user interface of the system of FIG. 1.

As shown in the embodiment illustrated in FIG. 3, the user interface may display a project view 300, which provides an add link 302, an edit link 304, a view link 306, and links to organize client project details 308 such as project name entry, a client name entry, a project description, and payment information, start and end dates selections 310, and notices 312, in addition to relevant alerts 314 and other notes 316. In some embodiments, the project user can include custom sections, fields, documents, or certifications, such as a bonus pay, as well.

Figure 4:
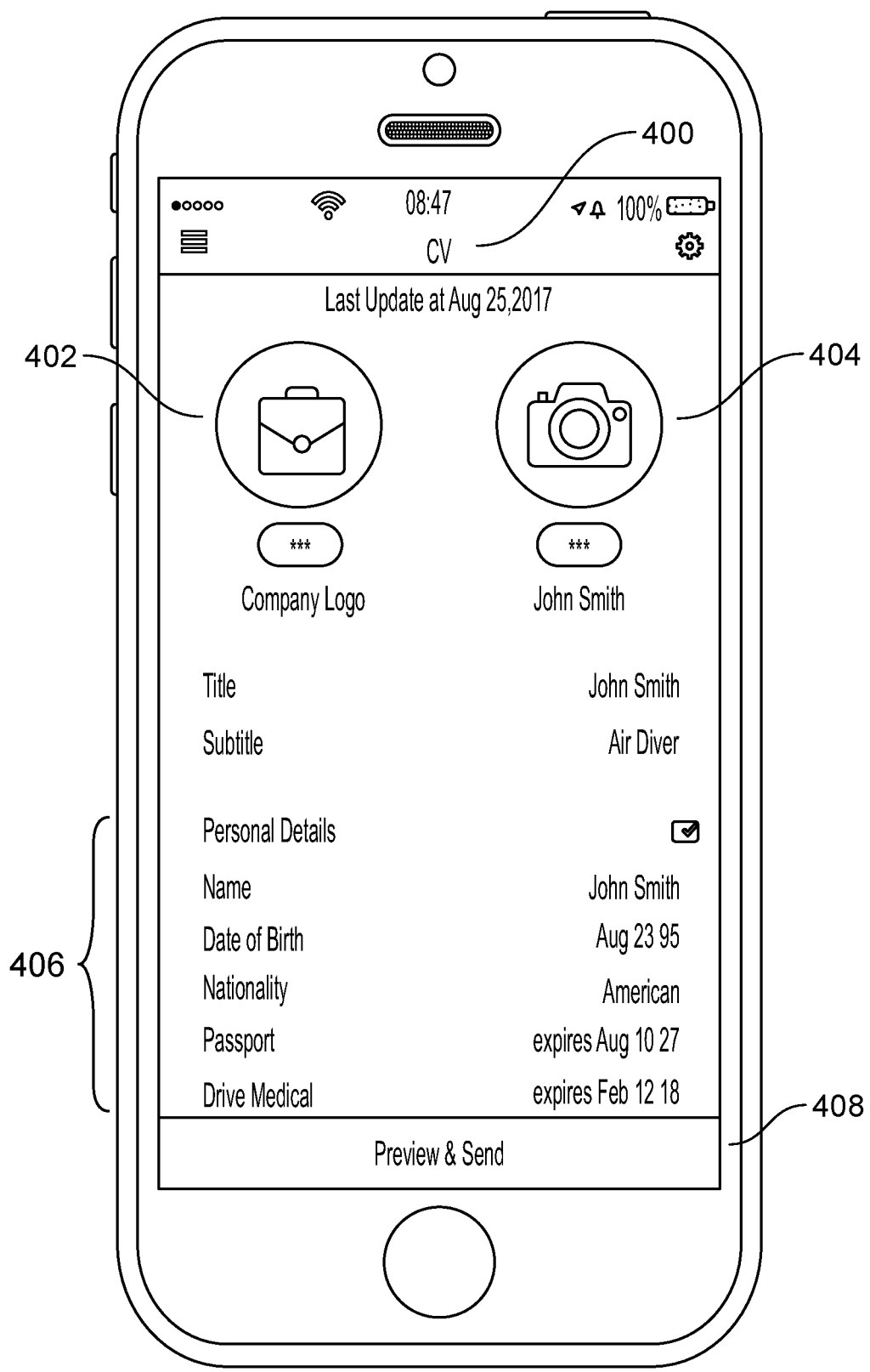
FIG. 4 is an example of a resume user interface of the system of FIG. 1.

As shown in the embodiment illustrated in FIG. 4, the system 100 may include a resume user interface 400, which allows users to add, view, and organize resume-related data. The user may upload a company logo 402, a photograph 404, personal details 406. In some embodiments, the user may highlight a professional summary. The user may press the preview and send button 408 to transmit this data as a formatted document such as a pdf. Users may add custom sections, fields, documents, or certifications directly from the user's list of documents.

Figure 5:
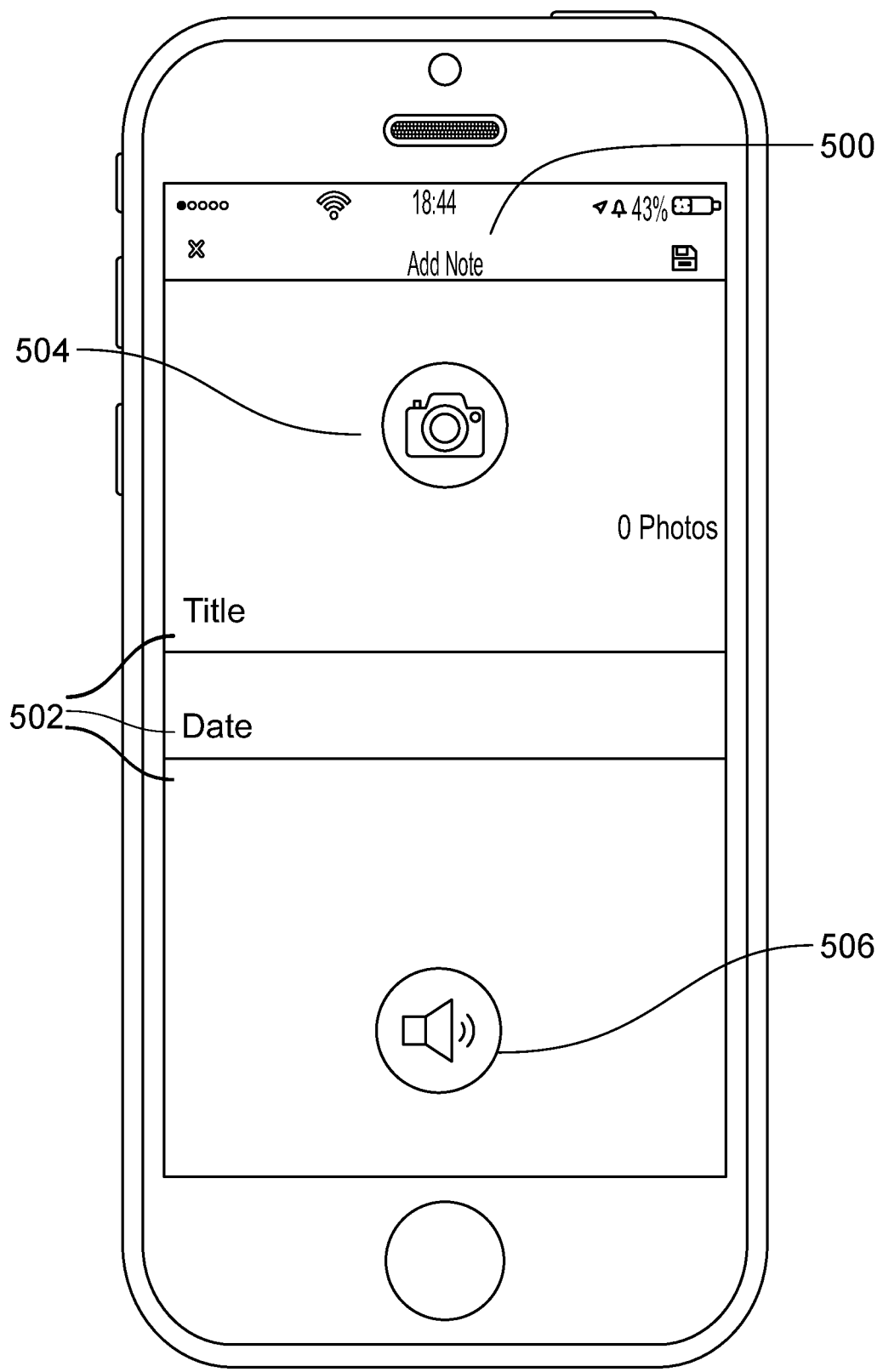
FIG. 5 is an example of a note user interface of the system of FIG. 1.

As shown in the embodiment illustrated in FIG. 5, the system 100 includes a note user interface 500, which allows users to save notes on the system. The note may include information 502 such as a title, a date, and a text body. The user may include photos added through a camera button 504 or an audio clip added through an audio button 506.

Figure 6:
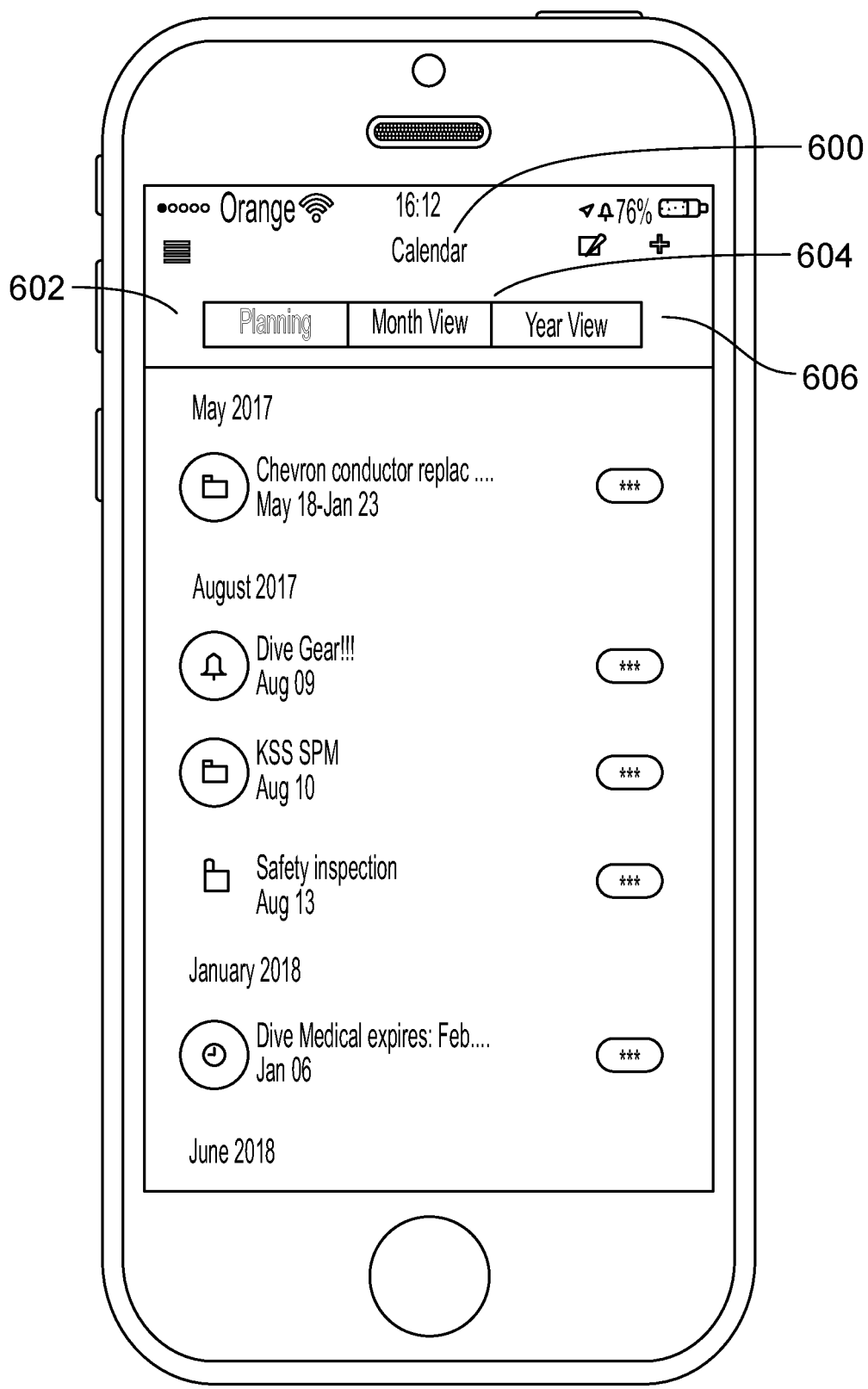
FIG. 6 is an example of a calendar user interface of the system of FIG. 1.

Referring to FIG. 6, the system 100 includes a calendar user interface 600 to allow users to view calendar details in a list format or by month or year. To view the list format, the user selects a planning button 602. The user may also select the month button 604 or the year button 606 to view and organize associated dates, alerts, and notes related to various client projects mapped out on these timelines.

Figure 7:
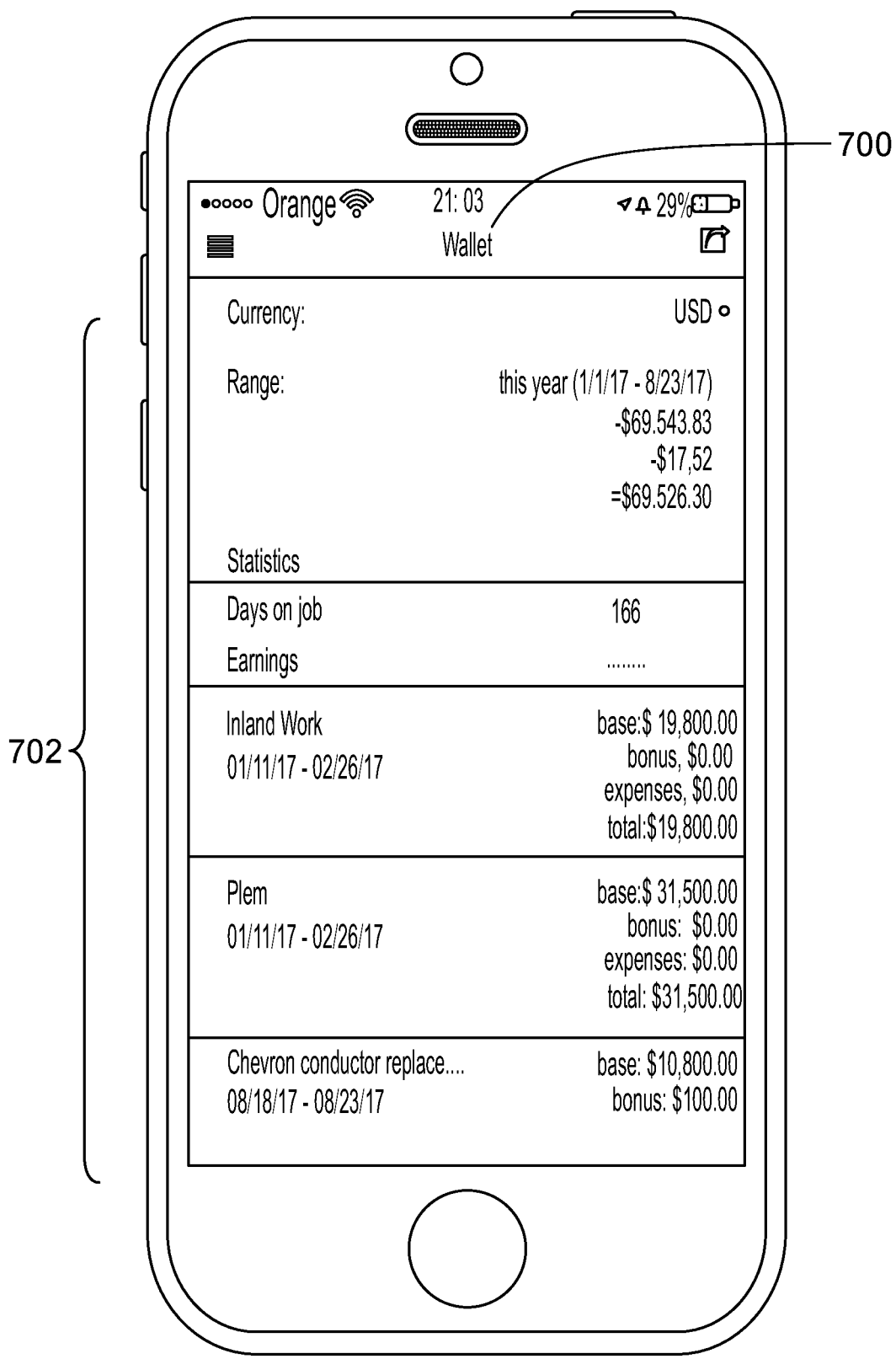
FIG. 7 is an example of a wallet user interface of the system of FIG. 1.

As shown in the embodiment illustrated in FIG. 7, the system 100 may include a wallet user interface 700, which allows users to add, view, and organize income and invoice statistics. The user may view details 702 related to a specific project or a date range. The user may also generate pay and expense reports.

Figure 8:
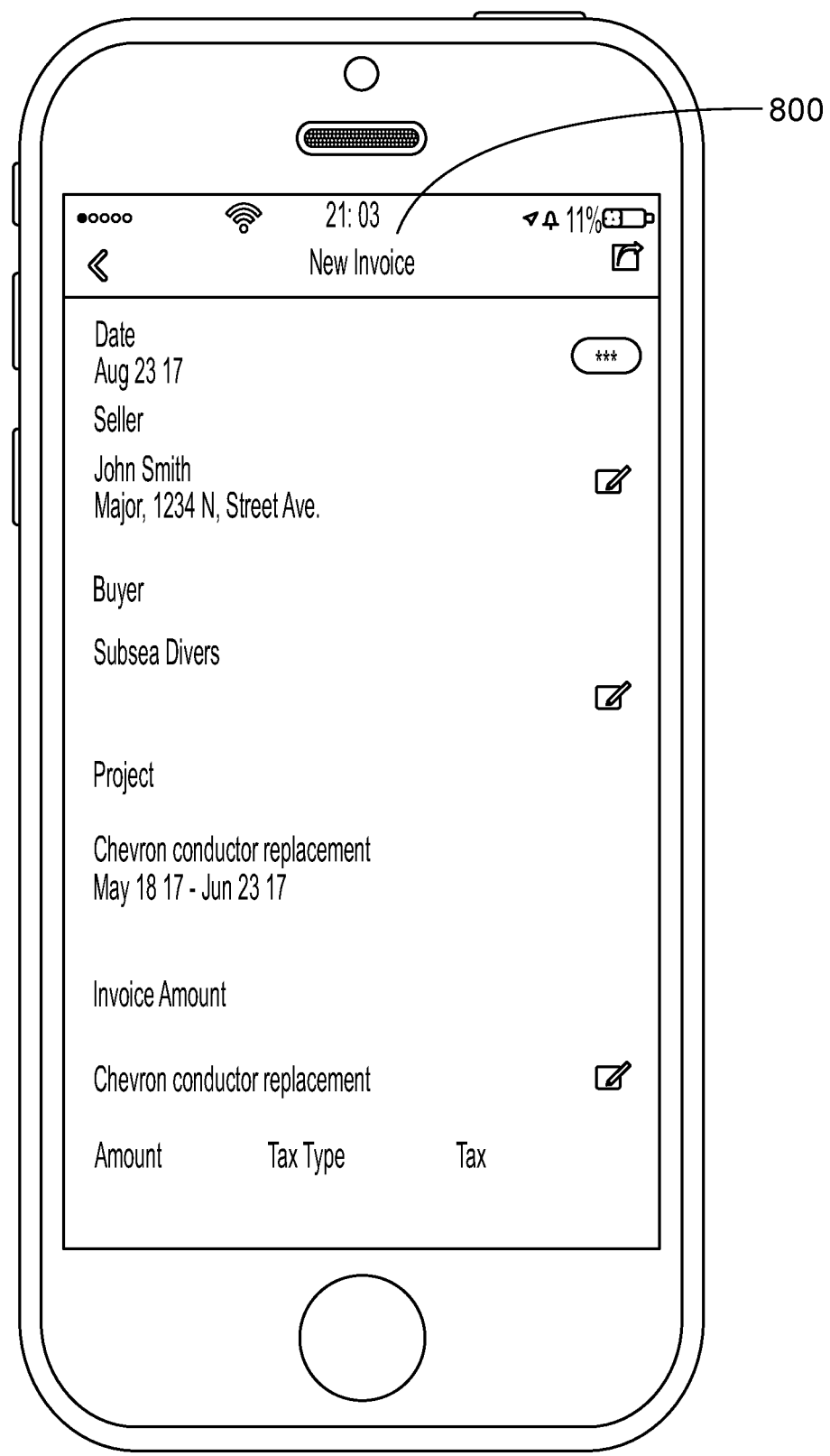
FIG. 8 is an example of an invoice user interface of the system of FIG. 1.

As shown in the embodiment illustrated in FIG. 8, the system 100 may include an invoice user interface 800. The user may generate an invoice based on data 111 from the database 110, using buttons to compile, add, or edit invoice information for a particular project or client.

Figure 9:
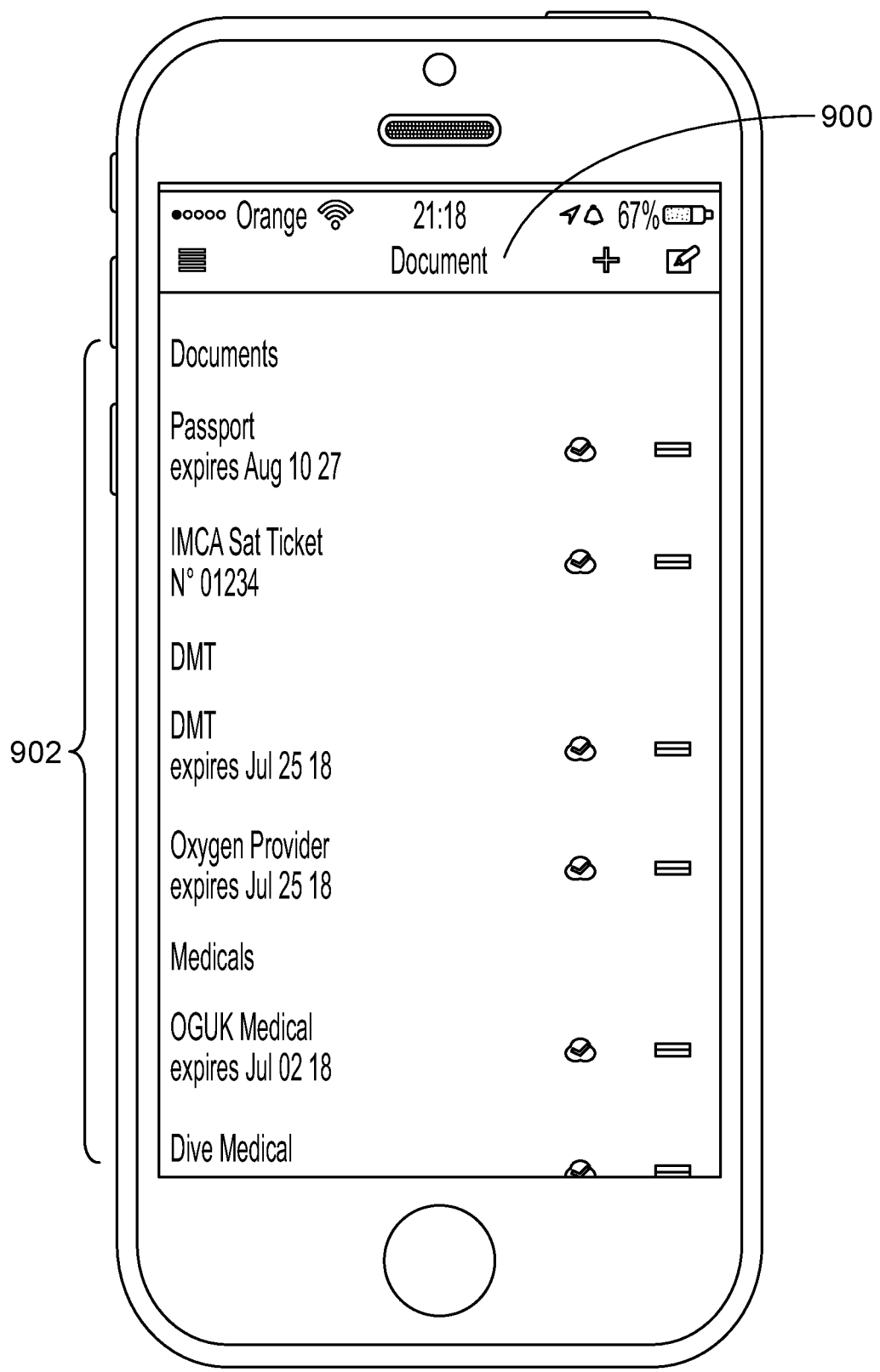
FIG. 9 is an example of a document user interface of the system of FIG. 1.

As shown in the embodiment illustrated in FIG. 9, the system 100 may include a documents user interface 900. The documents user interface 900 displays a list 902 of the user's documents that are stored on the database 111, and enables the user to add, view, and organize business documents as well as send the documents from the system's servers 106.

Figure 10:
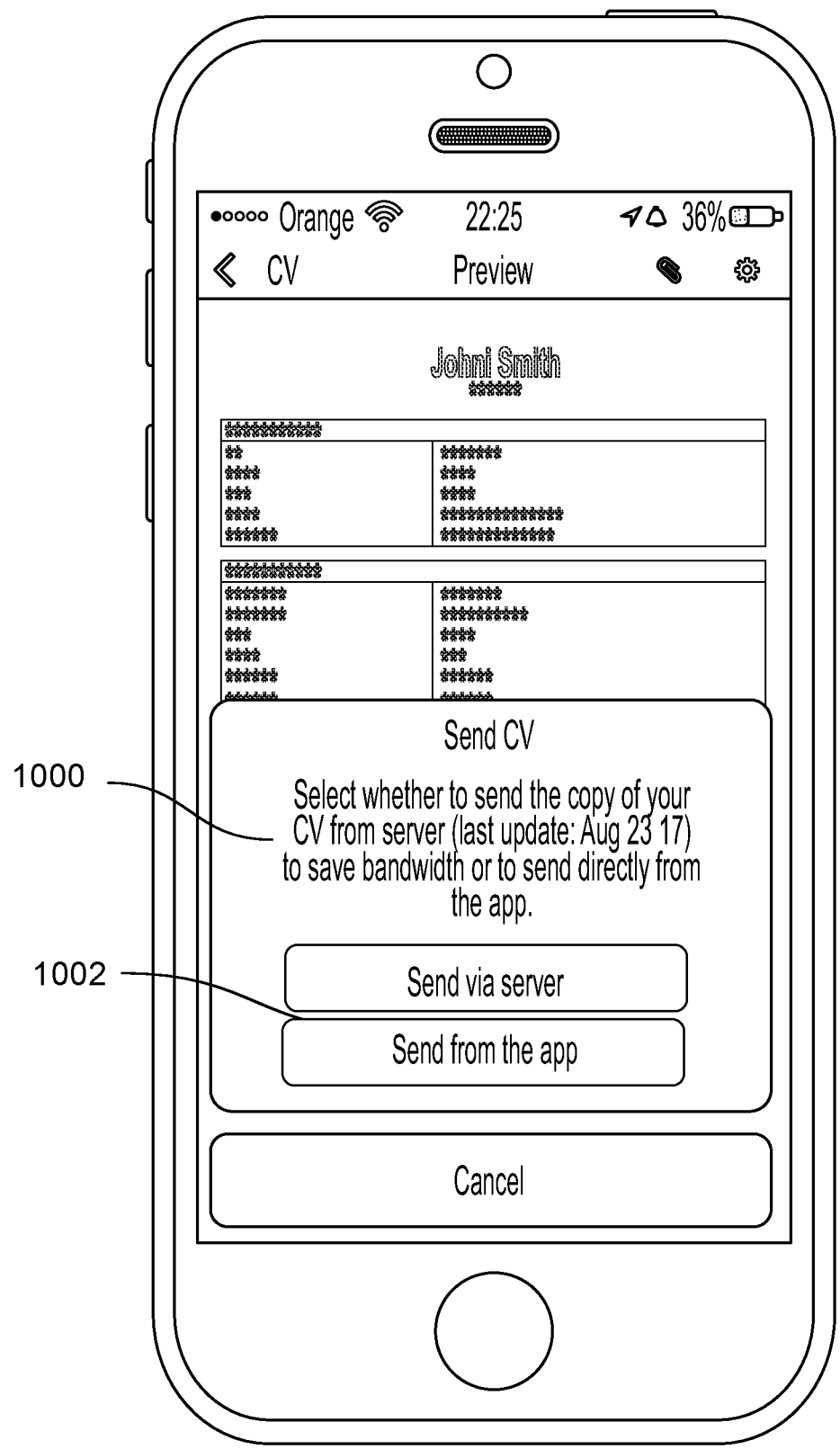
FIG. 10 is an example of a user interface including the option to send a resume via the system's servers or from within the app itself.

Once the system 100 generates a message in order to transmit a document such as a note, a resume or CV, an invoice, or any other file or data stored on the user's account, the relevant user interface typically provides an option for the user to preview the message and/or attachment prior to sending. The system 100 then gives the user the option of sending the message via the server 106 or sending the message with an attachment or data file directly from the mobile application as shown in FIG. 10. In the first option 1000, the system 100 utilizes available email providers such as Gmail®, Yahoo®, or Hotmail® to send the message directly from the mobile application. More specifically, the system generates an email using the email provider that the user had registered in connection with the system 100. The email is sent from the email provider to an email address of the recipient. Alternatively, the user can select a second option 1002 to send the message and the attachment directly to the receiver using the server 106. In this option, the system 100 generates and sends a message to the server 106 through a network connection such as a cellular service or Wi-Fi network via the mobile application directly. In some embodiments, the size of the message that is transmitted through a limited connection may be between about 800 bytes to about 40 KB. Once the server 106 receives the message, the server 106 retrieves the attachment or data file from the user device 102 and forwards it to the user's specified recipient. In some embodiments, the server 106 automatically retrieves the attachment or data file as described. The server 106 may send the attachment directly to the receiver. In other embodiments, the server 106 sends the attachment to the receiver using an email provider such as Gmail®, Yahoo®, or Hotmail®.

In an alternative embodiment, the system detects an internet speed and sends the message to the receiver using either an available email provider or the server 106 depending on the available internet connection. When the available internet connection is operating at a normal or acceptable speed, the system 100 utilizes available email providers such as Gmail®, Yahoo®, or Hotmail® to send the message directly from the mobile application. When the available internet connection is operating at a speed below a minimum threshold, the system sends a message from the user's device to the server 106 to send messages.

Figure 11:
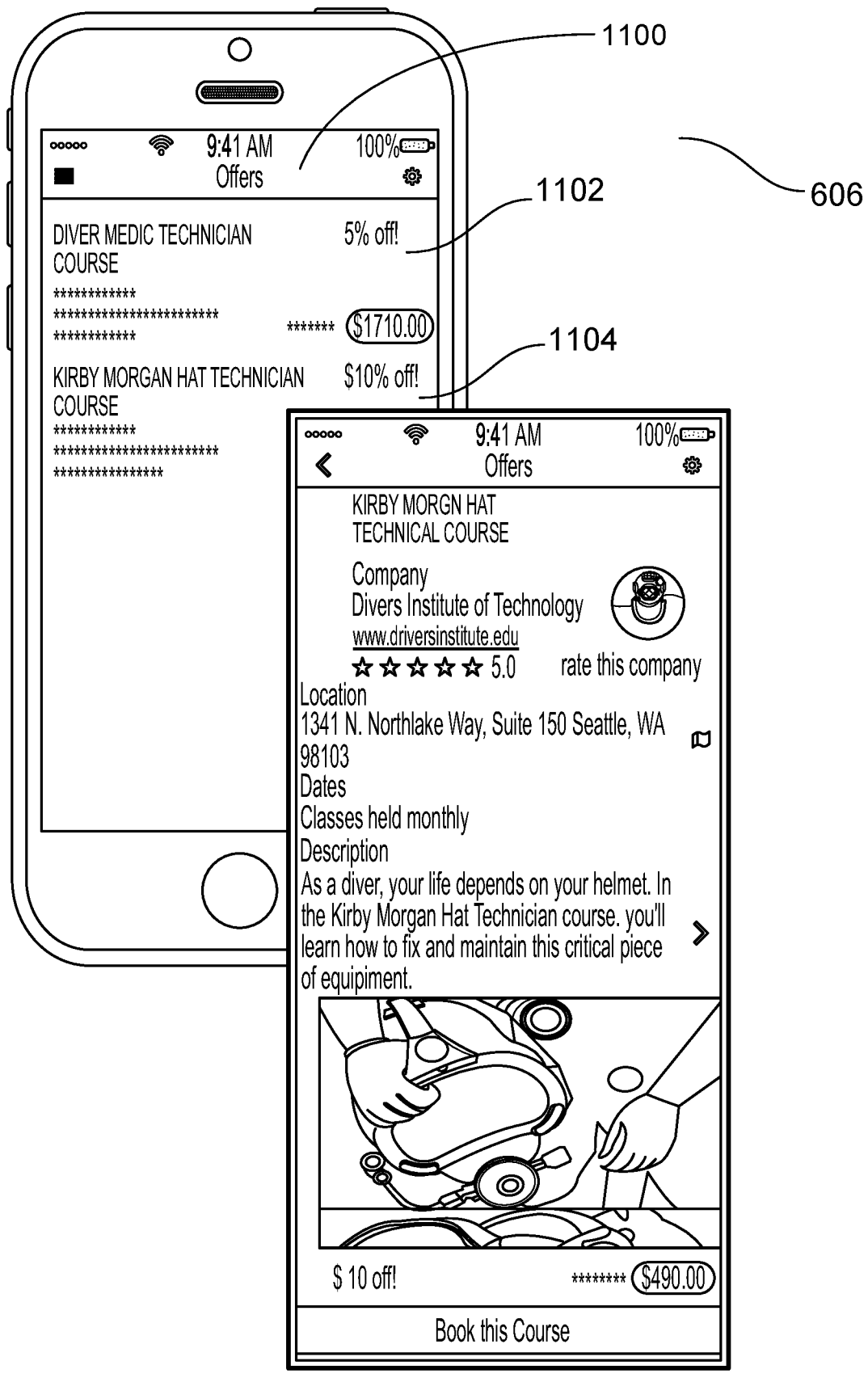
FIG. 11 is an example of an offer user interface of the system of FIG. 1.

Referring to FIG. 11, the system 100 may include an offer user interface 1100, which allows users to access and select offers 1102, 1104 related to business information entered on the system 100. For example, a user may receive offers 1102, 1104 related to the industry with which they are involved or an alert that a particular training certification is set to expire. In the case of an upcoming certification renewal deadline, the offer may be tailored to provide a user a deal or information from a training business that could provide a needed certification near the user's location. The user may be able to access additional offer details such as user ratings and price. The "offer" category, for example, may include business alerts, job postings, and equipment.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. An electronic message and data file communication system comprising:
   a server;
   a database in communication with the server, the database storing at least a first copy of a first data file;
   a sending user device in communication with the server through the Internet, the sending user device including a sending user device controller and a sending user device memory coupled to the sending user device controller configured to store program instructions executable by the sending user device controller, the sending user device memory also including a second copy of the first data file; and
   a receiving user device in communication with at least one of the server and the sending user device;
   wherein in response to executing the program instructions executable by the sending user device controller, the sending user device controller is configured to:
      receive a user instruction to send a message including the first data file such that the first data file is accessible by the receiving user device;
      display, in response to receiving the user instruction to send the message including the first data file such that the first data file is accessible by the receiving user device, a user interface including:
         a first option to send the first data file from the sending user device through the Internet such that the first data file is accessible by the receiving user device; and
         a second option to send the first data file from the server such that the first data file is accessible by the receiving user device, wherein the second option includes an identification of the date on which the first copy of the first data file was saved in the database;
      receive a selection of the first option or the second option through the user interface;
      when the selection of the first option is received, cause the sending user device to send a message including a copy of the second copy of the first data file via an email service provider through the Internet such that the first data file is accessible by the receiving user device; and
      when the user selection of the second option is received, cause the sending user device to send instructions that do not include a copy of the second copy of the first data file to the server instructing the server to send a copy of the first copy of the first data file such that the first data file is accessible by the receiving user device;
      wherein in response to executing the program instructions executable by the sending user device controller, the sending user device controller is further configured to detect a speed of the Internet connection of the sending user device and, if the detected speed is above a minimum threshold, the sending user device selects the first option and, if the detected speed is below a minimum threshold, the sending user device selects the second option.

2. The system of claim 1, wherein the email service provider is one of Gmail®, Yahoo®, and Hotmail®.

3. The system of claim 1, wherein the first data file includes invoice data.

4. The system of claim 1, wherein the first data file includes a resume.

5. The system of claim 1, wherein the sending user device is a mobile phone.

* * * * *